Figure 1:
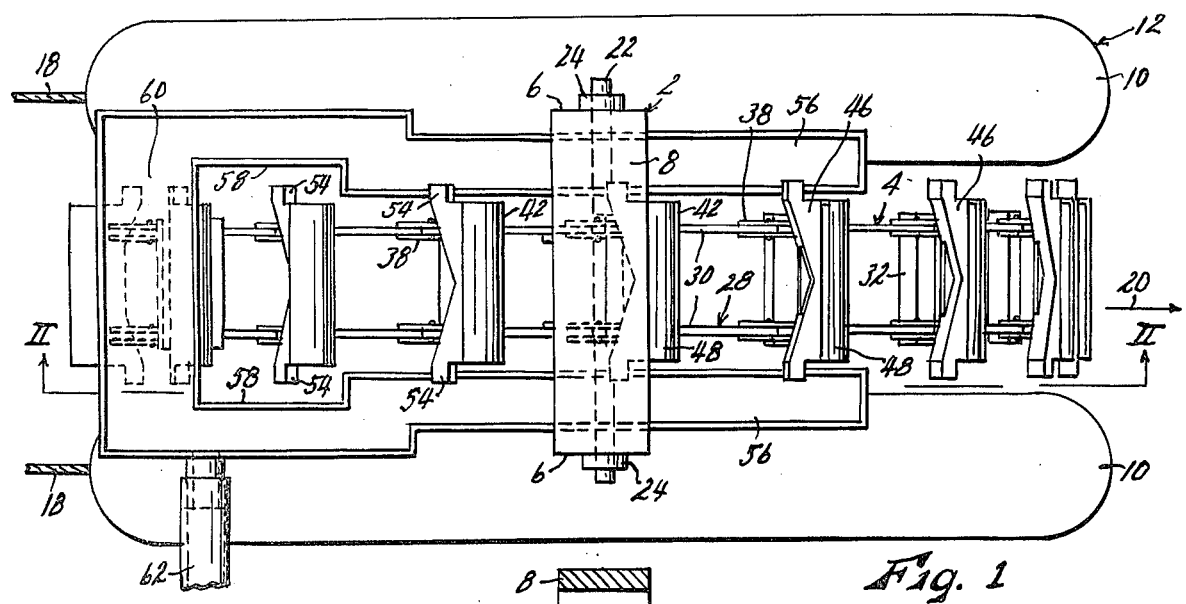

United States Patent [19]

Graden

[11] 4,280,789

[45] Jul. 28, 1981

[54] WATER ELEVATING WHEEL

[76] Inventor: Lester E. Graden, 1218 Lawrence Ave., Leavenworth, Kans. 66048

[21] Appl. No.: 965,832

[22] Filed: Dec. 4, 1978

[51] Int. Cl.³ .............................................. F03B 7/00
[52] U.S. Cl. ............................................ 415/6; 415/7
[58] Field of Search ......................... 415/6, 7, DIG. 2; 416/85, 87, 101

[56] References Cited

U.S. PATENT DOCUMENTS

| 138,312 | 4/1873 | Bell .......................................... 415/6 |
| 271,145 | 1/1883 | St. Clair .................................. 415/7 |
| 485,624 | 11/1892 | Gardner ................................... 415/6 |
| 571,510 | 11/1896 | Chavanne ........................... 416/197 B |
| 697,317 | 4/1902 | Brian ..................................... 415/6 X |
| 730,260 | 6/1903 | Harris ...................................... 415/6 |
| 775,008 | 11/1904 | Kahler ........................... 415/DIG. 2 |
| 799,489 | 9/1905 | O'Donnell ............................... 415/6 |
| 810,066 | 1/1906 | Maguin .................................... 415/6 |
| 852,022 | 4/1907 | Kirschweng ............................. 415/7 |
| 1,497,631 | 6/1924 | Engeset ............................ 416/101 X |
| 1,631,647 | 6/1927 | Robinson ................................. 415/7 |
| 2,135,115 | 11/1938 | Schlachter ............................. 416/85 |
| 2,850,261 | 9/1958 | Rutkove .......................... 416/101 X |

FOREIGN PATENT DOCUMENTS 1528932  3/1972  Fed. Rep. of Germany .............. 415/6
2731245  1/1979  Fed. Rep. of Germany .............. 415/6
908728   4/1946  France .................................... 415/6

OTHER PUBLICATIONS

Perpetuum Mobile or Search for Self-Motive Power from the 13th to the 19th Century, by Henry Dircks, C.E., 2nd series, (London-E. and F. N. Spon, 1870) pp. 46-47.

*Primary Examiner*—Everette A. Powell, Jr.
*Attorney, Agent, or Firm*—John A. Hamilton

[57] ABSTRACT

A wheel for elevating water from moving streams, for purposes of irrigation and the like, consisting of a wheel supported for rotation on a horizontal axis, being supported for example by a barge moored in the stream, with the lower portion thereof immersed in the stream and having paddles mounted about its periphery whereby it is turned by the momentum of the stream water. At least certain of the paddles carry buckets which elevate water from the stream and dump it in a trough at a higher elevation than the stream level, from which it may flow for irrigation or other uses. The buckets are so configurated, and are movable relative to the wheel in such a manner, as to both dump the water at a maximum elevation in the wheel elevation, and also to provide a turning torque at the descending side of the wheel, so as to assist in its operation.

2 Claims, 6 Drawing Figures

WATER ELEVATING WHEEL

This invention relates to new and useful improvements in devices for elevating water from rivers or other moving streams of water for use in irrigating nearby fields, or for other uses, and its principal object is the provision of such a device which is powered entirely by the momentum energy of the water in the stream. Electrically operated pumps and the like are presently commonly used for this purpose, but the electric power is of course expensive, and depends for its generation on the use of dwindling resources of fossil fuels and the like. In view of the crisis shortage of such fuels, it is believed that devices using readily available, no-cost energy not presently being used will become increasingly more important and more prevalent in the future.

Generally, this object is accomplished by the provision of a wheel rotatable on a horizontal axis and having its lower portion immersed in the stream, having paddles mounted about its circumference whereby it is turned by the moving water, and also buckets, which fill with water when immersed in the stream, and are elevated by the turning of the wheel to the top of the wheel, where they dump the water into a collecting trough. The trough is sufficiently elevated to provide a water head for causing the water to flow by gravity to surrounding fields for irrigating them, or to other use stations.

Another object is the provision of a device of the character described in which the wheel is supported by a barge moored in the stream. The wheel could of course be carried by a fixed frame built above the water, but the use of a barge permits the wheel to be positioned in whatever part of a stream has the strongest currents, which may vary from season to season, and by swinging about its moorings to align the wheel with the current, maximum power may be derived despite changes in the current direction.

A further object is the provision of a device of the character described wherein each bucket is so configurated as to delay the dumping of water therefrom until it reaches the extreme top portion of its orbit, whereby to provide the maximum possible elevation of lift.

A still further object is the provision of a device of the character described wherein each bucket, though extending the full width of a paddle wheel, and receiving water therein across its entire width, dumps its water only through side-directed spouts at its extreme sides, whereby to direct the water accurately into collecting troughs at its sides. This avoids much inefficient spillage of water which has already been elevated by the expenditure of useful energy.

Still another object is the provision of a device of the character described in which the paddles and buckets are movably associated with the wheel so that their centers of gravity may be selectively retracted toward the wheel axis or extended therefrom, and automatically positioned to be retracted at the ascending side of the wheel to reduce the wheel torque required to elevate the full buckets, and to be extended at the descending side of the wheel, so as to supply additional torque to the wheel to assist in its operation.

Other objects are simplicity and economy of operation, and efficiency and dependability of operation.

Figure 2:
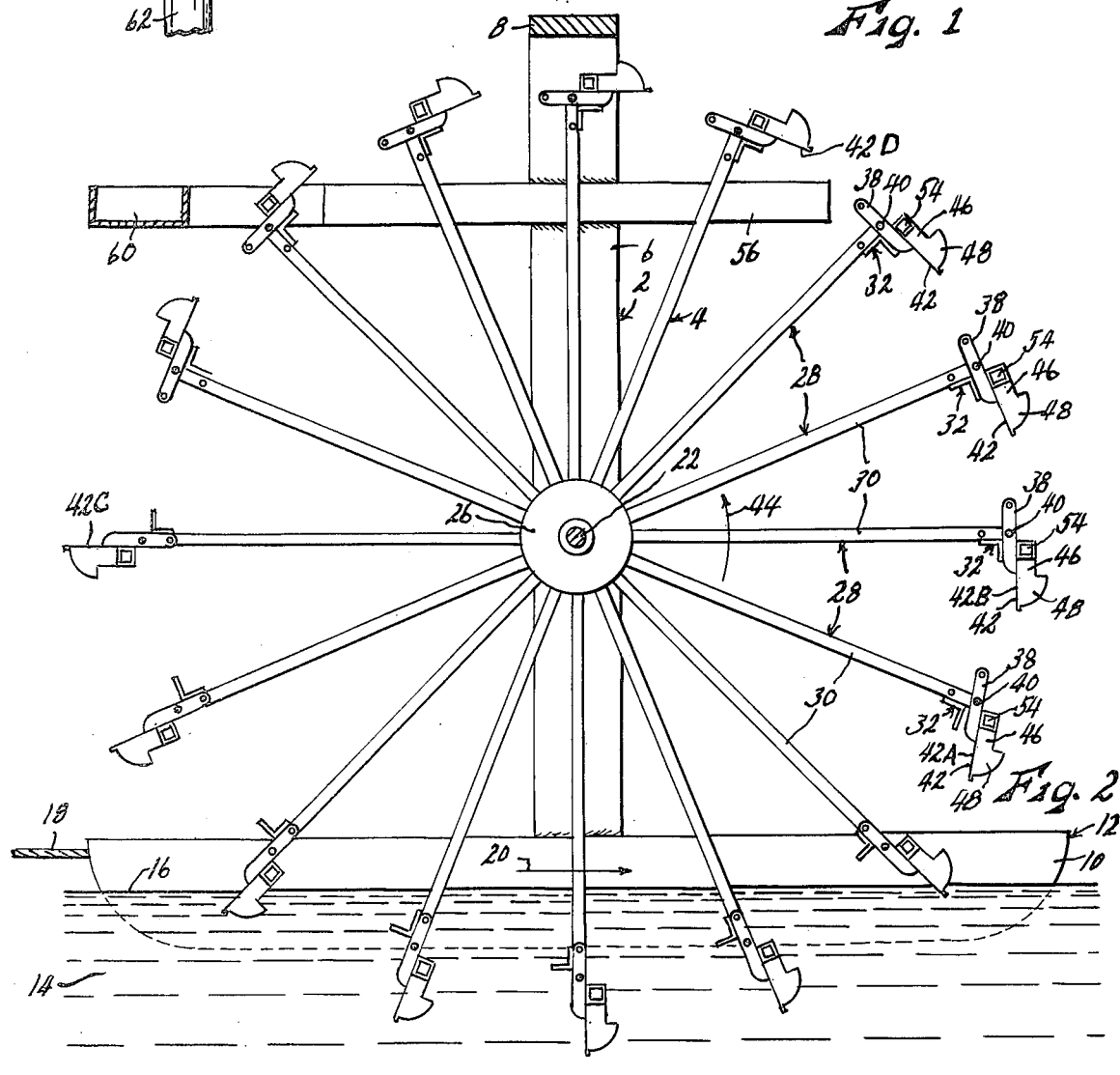
Figure 3:
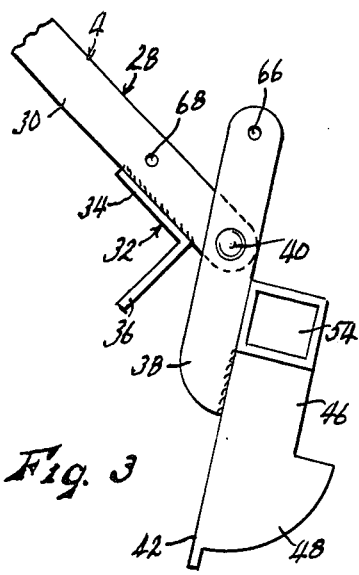
Figure 5:
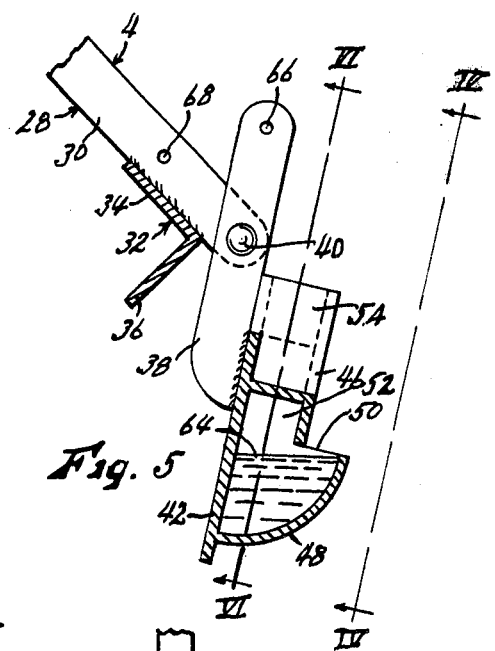
Figure 4:
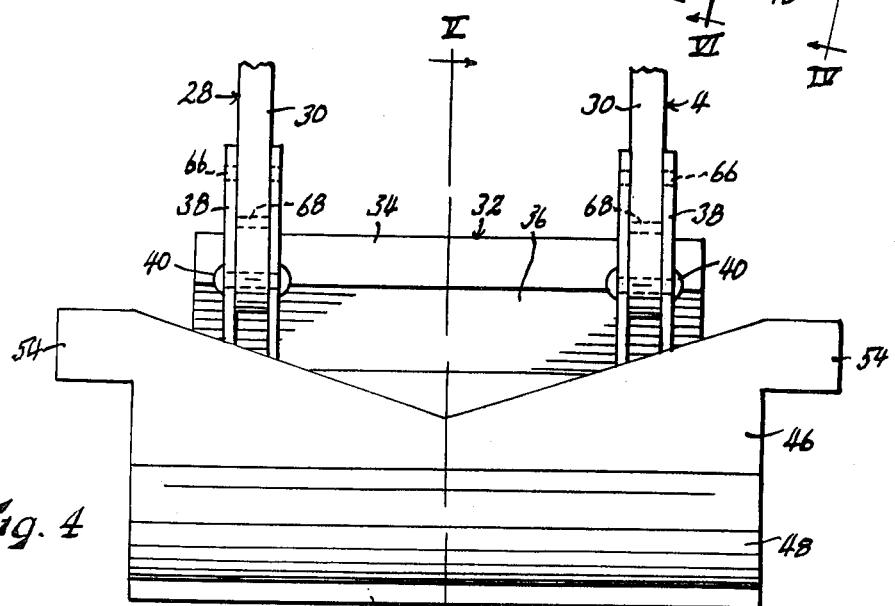
Figure 6:
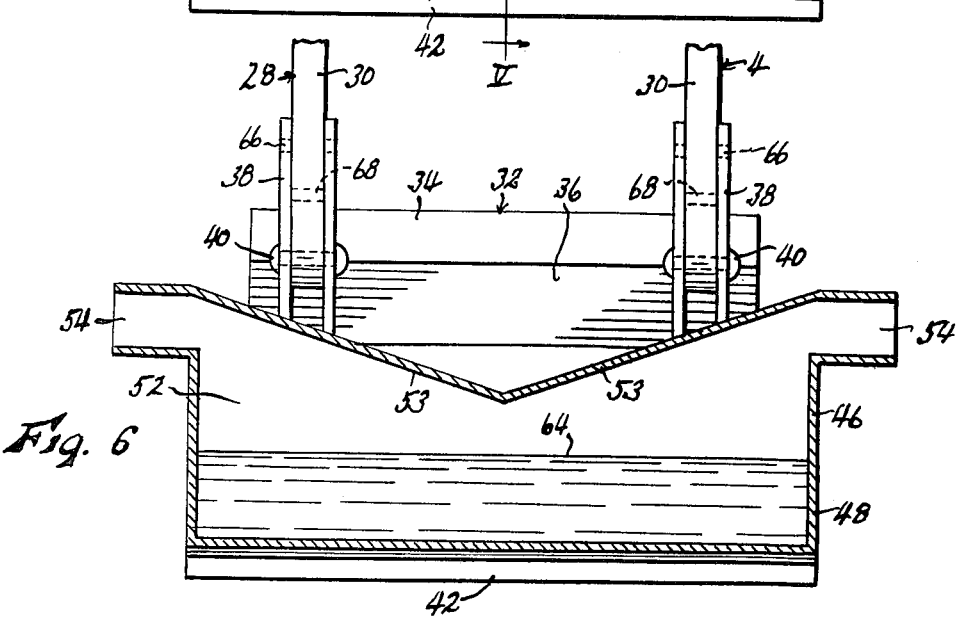

With these objects in view, as well as other objects which will appear in the course of the specification, reference will be had to the accompanying drawing, wherein:

FIG. 1 is a top plan view of a water elevating wheel embodying the present invention, FIG. 2 is a slightly irregular sectional view taken generally on line II—II of FIG. 1, FIG. 3 is an enlarged end elevational view of one of the paddle-buckets, together with the adjacent portion of its associated wheel spoke, FIG. 4 is a face elevational view of a paddle-bucket as shown in FIG. 3, and as indicated by line IV—IV of FIG. 5, FIG. 5 is a fragmentary sectional view taken on line V—V of FIG. 4, and FIG. 6 is a sectional view taken on line VI—VI of FIG. 5.

Like reference numerals apply to similar parts throughout the several views, and the numeral 2 applies generally to a frame in which a water elevating wheel designated generally by the numeral 4 is mounted. Frame 2 consists of a pair of parallel vertical uprights 6 rigidly connected at their upper ends by a horizontal cross bar 8, and each fixed at its lower end to a narrow elongated pontoon 10 extending at right angles to cross bar 8, and laterally spaced apart, said pontoons and frame 2 conjointly forming a barge indicated generally by the numeral 12. The pontoons are adapted to be floated in a river or other moving stream 14, with frame 2 extending above water level 16 to any desired height. The barge is adapted to be moored in the stream by mooring lines 18 connected to the upstream ends of pontoons 10, said lines converging into a single line at the midline of the barge, the single line being secured to a suitable mooring post, whereby the barge may swing with the current to align the pontoons with the current. The flow of current is in the direction of arrow 20 in FIGS. 1 and 2. This arrangement of the mooring lines is not fully illustrated, but is well understood in the art.

The wheel 4 is mounted on an axle 22 which extends horizontally, well above the water level, between uprights 6, and is journalled rotatably in bearings 24 carried by said uprights. Said wheel includes a hub 26 fixed on axle 22, and a large number of spokes 28 fixed to and extending radially outwardly from said hub in regularly spaced angular relation. Said spokes are of sufficient length to extend below water surface 16 in the lower portions of their orbits, between pontoons 10. Each of said spokes comprises a pair of parallel, laterally spaced apart bars 30, rigidly interconnected together adjacent their outer ends by a transversely extending angle iron stop 32 welded or otherwise rigidly affixed thereto. As best shown in FIGS. 3 and 5, each of said angle irons has one leg 34 the plane of which is generally radial to the wheel, and a leg 36 extending at right angles to leg 34 along the outer edge of the former.

Just outwardly of each stop 32, each spoke bar 30 of each spoke 28 has an intermediate point of a short double arm 38 freely pivoted thereto be means of a rivet 40, the pivotal axis of the two arms being coaxial. Fixed to and interconnecting corresponding end portions of the two arms is a paddle 42 consisting of a generally rectangular plate the major dimension of which extends horizontally and laterally of the wheel. Keeping in mind that the wheel turns in the direction of arrow 44 in FIG. 2, as will appear, it will be seen that the pivots 40 of each paddle 42 permit the paddle to turn on said pivots in the same direction as the wheel turns until it is disposed generally radially to the wheel, as in the lowermost paddles of the wheel in FIG. 2. At this time arms 38 engage leg 34 of stop 32 to prevent further movement. This may be termed the extended position of the paddle. The paddle may also turn in the opposite direction to a position wherein its plane is generally tangential to the wheel, as shown at the top of FIG. 2, at which time arms 28 engage leg 36 of stop 32 to prevent further movement. This may be termed the retracted position of the paddle.

Affixed to the leading face of each paddle 42, relative to the direction of rotation of the wheel, is a housing 46 which provides a bucket portion 48 extending the full width of the paddle and open along the edge thereof toward pivots 40 to receive water therein, as indicated at 50 in FIG. 5, and a housing chamber 52 opening into the portion of bucket 48 closest to the paddle, across the entire width of the paddle, and directing water flowing from said bucket, when the bucket edge of the paddle is sufficiently high, to a pair of laterally outwardly directed spouts 54, also formed by the housing, and disposed respectively at laterally opposite sides of the paddle. Said spouts project outwardly from the side edges of the paddle. The wall 53 of chamber 52 opposite from bucket 48 is inclined toward each of the spouts to encourage the flow of water toward the spouts (see FIG. 6).

Adjacent the respectively opposite sides of the wheel, adjacent the top thereof, there are disposed a pair of horizontal, open-topped collecting troughs 56, said troughs being affixed to frame uprights 6. Said troughs are spaced laterally apart sufficiently to allow paddles 42 and buckets 48 to pass therebetween when the wheel turns, but not spouts 54. At the ascending side of the wheel, the troughs terminate close enough to the vertical plane of the wheel axis to allow spouts 54 to pass thereover, so that said spouts overlie the troughs to discharge water thereinto. At the descending side of the wheel, the confronting sides of the troughs are offset outwardly, as indicated at 58 in FIG. 1, to allow the spouts to pass below the troughs. Entirely outside the orbit of the wheel, the two troughs 56 are interconnected by a cross trough 60, and a water conduit 62, which may if desired be a flexible hose, is interconnected into a side wall of any part of the composite trough for conducting water to any desired lower station.

In operation, it will be seen in FIG. 2 that as the wheel turns in the direction of arrow 44, each paddle 42 will have been moved to its extended position by gravity as said paddle enters and passes below water surface 16, with arms 38 thereof pressed against stop leg 34 by the force of the water current. The current thus acts against the paddles to supply the motive power for turning the wheel, so long as the paddles are immersed in the water. At this time also, the bucket 48 of each paddle fills with water. As soon as each paddle emerges from the water, it pivots at 40 to hang freely by gravity, with its arms 38 not engaging stop 32 at all, as shown by the paddle further indicated by the numeral 42A in FIG. 2, and in FIGS. 3 and 5. By the time each paddle rises to a position in which its spoke 28 is horizontal, as indicated by paddle 42B, its arms 38 will rest solidly against stop leg 36, this being its retracted position, in which it will remain as the paddle traverses the top portion of the wheel orbit. As each paddle moves downwardly on the descending side of the wheel, and approaches a position in which its spoke 28 is horizontal, it again pivots by gravity to its extended position, as indicated by paddle 42C, and the cycle repeats itself continuously.

The bucket 48 and chamber 52 of each paddle of course fill completely with water when submerged, but as soon as the paddle emerges from the water, the water drains from housing 46 to fill only the bucket 48, assuming a level 64 therein as indicated in FIG. 5, and only this amount of water is elevated. As the paddle approaches a horizontal plane at the top of the wheel orbit, water flows from bucket 48 through chamber 52 and outwardly through spouts 54 to be delivered into troughs 56, which deliver it to conduit 62 for conveyance to any desired remote use station. The inclined housing walls 53 of chamber 52 assist the flow of water laterally of the paddle toward the discharge spouts 54. Also, it will be seen that at the ascending side of the wheel, the spouts 54 of each bucket are spaced well above the water level 64 of that bucket, and that as a consequence the associated paddle may be turned to a nearly horizontal plane, say to the position of paddle 42D, before any appreciable amount of water flows through its spouts 54. This does not occur until the paddle is nearly at the top of its orbit. Thus troughs 56 may be disposed at an elevation nearly at the top of the wheel, as shown. This feature, in otherwise similar wheels, provides a higher water lift for wheels of the same diameter. Another feature is that the paddles and their buckets are in their retracted positions at the ascending side of the wheel, thereby shifting their center of gravity, together with that of the water carried thereby, closer to wheel axle 22 and reducing the torque which would otherwise be required to turn the wheel, while said paddles are in their extended positions at the descending side of the wheel, thereby shifting their centers of gravity further from axle 22 to assist in providing a turning torque to the wheel. This provides an overall reduction in the water power required to turn the wheel, and hence increases the water elevating capacity of a wheel of any given size.

The water capacity and height of lift of the wheel is determined by such factors as the number and volume of buckets 48, the number and area of the paddles 42, and the diameter of the wheel, and these factors are limited only by considerations of practicality. For any given wheel, its capacity is determined by the velocity of the current in stream 14, since this determines the speed at which the wheel will turn. Very slow-moving streams may in fact not provide the power to turn a given wheel at all, if the wheel is constructed as thus far described. This may be compensated for, for example, by reducing the volume of the buckets 48, increasing the area of the paddles relative to the buckets, or by entirely omitting the bucket housing 46 from certain of the paddles, taking care to remove said housings from paddles regularly spaced about the wheel periphery so that the wheel remains generally balanced. With the wheel structure shown, compensation of this type may be obtained by placing a bolt, not shown, through a hole 66 (FIGS. 3–6) formed in the support arms 38 of selected paddles 42, remotely from pivots 40, and through a mating hole 68 formed in the associated spoke bar 30. This locks the associated paddle, and its bucket 48 in the extended position. Thus the bucket associated with any paddle so locked in its extended position begins to dump its water outwardly through its spouts 54 almost as soon as it emerges from the stream at the ascending side of the wheel. With certain of the buckets thus emptied of water, the power required to turn the wheel is reduced, so that is may be driven by a slower-moving stream.

While I have shown and described a specific embodiment of my invention, it will be readily apparent that many minor changes of structure and operation could be made without departing from the spirit of the invention.

What I claim as new and desire to protect by Letters Patent is:

1. A water elevating device comprising:
   a. a frame,
   b. a buoyant barge capable of floating in a moving stream of water,
   c. a wheel carried by said frame for rotation on a horizontal axis transverse to the stream current, at such an elevation that its lower portion is submerged in said stream,
   d. paddles mounted on said wheel in spaced relation about the periphery thereof, whereby said wheel is turned by the current of said stream, each of said paddles being essentially planar in a plane transverse to the plane of the wheel, and being pivotally mounted on said wheel on a horizontal transverse axis for movement between an extended position, in which its plane extends generally radially outwardly from said wheel, and outwardly from its pivotal axis, to a retracted position trailing behind its pivotal axis in which its plane is disposed generally tangentially to the wheel, whereby each of said paddles pivots by gravity to said extended position at the descending side of said wheel, and to said retracted position at the ascending side of said wheel,
   e. a bucket attached to the leading face of each of at least certain of said paddles so as to be filled with water when submerged in said stream, elevated above the water level of the stream by the turning of said wheel, and the water dumped therefrom in the upper portion of the wheel orbit by inversion thereof caused by rotation of the wheel, said bucket being mounted on the portion of said paddle extending radially outwardly from said wheel, and from the pivotal axis of said paddle, when the paddle is in its extended position, said bucket having a filling opening facing toward the pivotal axis of said paddle, and a discharge opening closer to the pivotal axis of said paddle than said filling opening, whereby said bucket fills when submerged, remains upright to retain water up to the level of said filling opening at the ascending side of said wheel, and dumps water through said discharge opening as said paddle approaches a horizontal plane at the top of said wheel, said filling opening being relatively widely spaced apart from the leading face of said paddle and said discharge opening being relatively closely adjacent said paddle whereby as the paddle approaches a horizontal plane water will flow through said discharge opening rather than said filling opening, said discharge opening of each of said buckets including a pair of spouts directed laterally outwardly from the respectively opposite sides of said bucket,
   f. receptacles carried by said frame adjacent the upper portion of said wheel, said receptacles comprising a pair of horizontal, open-topped troughs extending along respectively opposite sides of said wheel to receive water emerging from said spouts, and
   g. means operable to moor said barge against movement with the current of said stream, said mooring means comprising mooring lines connected to the upstream end of said barge and extending upstream therefrom, whereby said barge may shift laterally with any change in the current direction of said stream to align said wheel with said current.

2. A device as recited in claim 1 wherein said bucket is internally configured to form inclined ramps directing the discharge flow of water from said bucket laterally outwardly toward said side discharge spouts.

* * * * *